US010514168B2

(12) United States Patent
Koch et al.

(10) Patent No.: US 10,514,168 B2
(45) Date of Patent: Dec. 24, 2019

(54) VENTING APPARATUS FOR A HEATING DEVICE OPERATING WITH LIQUID FUEL IN A SINGLE-LINE MODE

(71) Applicant: Valeo Thermal Commercial Vehicles Germany GmbH, Gilching (DE)

(72) Inventors: Stefan Koch, Neubrandenburg (DE); Nico Soppa, Neubrandenburg (DE); Hans-Michael Wardenga, Neddemin (DE)

(73) Assignee: VALEO THERMAL COMMERCIAL VEHICLES GERMANY GMBH, Gilching (DE)

( * ) Notice: Subject to any disclaimer, the term of this patent is extended or adjusted under 35 U.S.C. 154(b) by 88 days.

(21) Appl. No.: 15/726,562

(22) Filed: Oct. 6, 2017

(65) Prior Publication Data

US 2018/0106477 A1  Apr. 19, 2018

(30) Foreign Application Priority Data

Oct. 14, 2016 (DE) .................... 10 2016 119 684

(51) Int. Cl.
*F23K 5/04* (2006.01)
*F02M 31/125* (2006.01)
(Continued)

(52) U.S. Cl.
CPC ............. *F23K 5/04* (2013.01); *F02M 31/125* (2013.01); *F16K 11/0716* (2013.01);
(Continued)

(58) Field of Classification Search
CPC ................ F02M 31/125; F23K 5/04
(Continued)

(56) References Cited

U.S. PATENT DOCUMENTS 4,511,119 A * 4/1985 Albertson ............ F02M 25/00
123/25 L
2012/0279484 A1  11/2012 Lange

FOREIGN PATENT DOCUMENTS

DE            83 625 A5     8/1971
DE    G 90 16 790.2 U1     3/1991
(Continued)

OTHER PUBLICATIONS

Communication dated Feb. 27, 2018, issued by the European Patent Office in counterpart European Application No. 17184467.3.
(Continued)

*Primary Examiner* — Avinash A Savani
*Assistant Examiner* — Aaron H Heyamoto
(74) *Attorney, Agent, or Firm* — Sughrue Mion, PLLC

(57) ABSTRACT

A heating device operating with liquid fuel in the single-line mode includes a fuel pump which draws fuel from a supply tank and delivers it into a pressure line region communicating with an atomiser nozzle opening into a combustion chamber, wherein excess fuel is returned from the pressure region to the suction side of the fuel pump by way of a pressure regulator, a return line and a bypass line. Arranged between the return line and the bypass line is a venting apparatus including an actuating element which is reciprocable between an operating position and a venting position and which in the operating position connects the return line to the bypass line to reliably seal the medium in the lines towards the exterior and in the venting position connects the return line to the exterior of the heating device and in that case closes the bypass line.

5 Claims, 5 Drawing Sheets

(51) Int. Cl.
  *F23K 5/14*   (2006.01)
  *F23K 5/20*   (2006.01)
  *F23K 5/18*   (2006.01)
  *F16K 11/07*  (2006.01)
  *F02D 41/06*  (2006.01)

(52) U.S. Cl.
  CPC .............. *F23K 5/142* (2013.01); *F23K 5/147* (2013.01); *F23K 5/18* (2013.01); *F23K 5/20* (2013.01); *F02D 41/06* (2013.01); *F23K 2301/204* (2013.01); *Y02T 10/126* (2013.01)

(58) Field of Classification Search
  USPC .......................................... 431/207; 137/866
  See application file for complete search history.

(56) References Cited

FOREIGN PATENT DOCUMENTS

DE    10 2004 050 121 A1    4/2006
GB         1292685 A    *   10/1972   .............. F04C 14/28

OTHER PUBLICATIONS

Office Action of German Application No. 10 2016 119 684.3 dated Jul. 6, 2017.

\* cited by examiner

VENTING APPARATUS FOR A HEATING DEVICE OPERATING WITH LIQUID FUEL IN A SINGLE-LINE MODE

BACKGROUND OF THE INVENTION

Field of the Invention

The invention concerns a venting apparatus for a heating device operating with liquid fuel in a single-line mode of the kind set forth in the classifying portion of claim 1 and a heating device equipped with such a venting apparatus.

Background

The heating devices described herein can be used both as stationary devices for heating buildings and also in vehicles, in particular in private cars, buses, utility vehicles, trucks, rail vehicles and the like. In the last-mentioned cases they serve in particular for heating the interiors of those vehicles and/or for preheating the engine coolant for example of diesel engines. Those heating devices include a fuel pump which is driven by a motor and which draws the liquid fuel from a supply container or tank by means of a feed line and feeds it to a pressure line region in which there prevails an increased pressure which is defined by a pressure limiter or pressure regulator. From that region the fuel flows to an atomiser nozzle, by means of which it is injected into a combustion chamber to form a burner flame.

In general there is provided a shut-off device which for example can be in the form of a solenoid shut-off valve and can be closed to interrupt the feed of fuel to the atomiser nozzle.

A particularity of the single-line systems which are involved here is that the fuel pump delivers a larger volume of fuel and feeds it to the pressure region, than is required for combustion. The fuel that is not required passes by way of the pressure limiter into a return line and from there into a bypass line which in turn is connected to the feed line, by way of which the pump draws the fuel from the fuel tank.

Both when such a single-line system is first brought into operation and also after repair and maintenance operations on the burner or after the tank has run empty it is necessary to vent the part of the system which is downstream of the tank.

In accordance with the state of the art that can be effected in various ways.

For example it is possible, after a pump startup which firstly takes place in such a way that the shut-off device disposed upstream of the atomiser nozzle is closed to generate the required pressure in the pressure line region, to open the shut-off device after a certain period of time and thus to vent the pressure line region by way of the atomiser nozzle. When the large part of the air is evacuated in that way fuel with bubbles therein occurs at the atomiser nozzle. The combustion which then occurs is highly irregular because the fuel is not yet available in an adequate amount and involves a severely fluctuating pressure. In that case large amounts of unburnt hydrocarbons and soot can be emitted.

This procedure is therefore is not only highly time-consuming but is also problematical from environmental points of view.

In order to minimise the period of time in which incomplete combustion takes place the shut-off device is quickly closed again but the fuel pump continues to operate for a run-on time.

During the startup and run-on times, with the shut-off device closed, no venting can take place and air included in the system is pumped around in the system by way of the return and bypass lines.

The procedure just described above can be combined with another preceding venting mode which can also be carried out on its own and in which a venting screw on the fuel pump or at another location in the pressure line region is opened. Known venting screws are pressed for example by being screwed into a female thread with a sealing surface against a sealing seat (which for example is conical) so that they sealingly close the pressure line region. Venting is then effected by the venting screw being loosened, in which case a gap opens at the sealing seat, through which the pressurised medium in the pressure line region can issue by way of a bore in the venting screw. When the issuing medium is bubble-free the venting screw is re-tightened and the system vented in that way is sealed off again.

What is common to both venting procedures is that discharge of fuel into the environment of the heating devices occurs. As the suction capacity of the pump is high, upon opening of the venting screw arranged downstream of the pump in the flow direction, there is the danger that it is primarily not excess air that escapes from the system, but additional air is drawn in the path of least resistance into the bypass and thus into the feed line of the pump again. To prevent that the bypass is usually closed by suitable components like for example non-return valves or further closure screws. Those additional components however are cost-intensive.

In addition many workshops use special items of equipment which serve to vent the system by a reduced pressure applied from the exterior. That also involves an increased level of apparatus involvement leading to additional costs.

SUMMARY OF THE INVENTION

In comparison the object of the invention is to provide a venting apparatus of the kind set forth in the opening part of this specification, which without using additional expensive components makes it possible to vent the pressure line region of a single-line system in an environmentally friendly and simple fashion.

The features according to the invention provide that the actuating element of the venting apparatus upon its movement from the operating position into the venting position firstly reliably separates the bypass line which leads to the suction side of the fuel pump from the return line and only thereafter forms a communication between the return line and the venting line leading to the exterior so that unwanted entry of air during the venting procedure is practically completely prevented.

A particular advantage of the apparatus according to the invention is that neither a non-return valve nor other cost-intensive components are required to safeguard the bypass line against unintended entry of air during the venting operation. Rather, the arrangement ensures that venting begins only when the bypass is completely closed so that no air can be sucked in during the venting procedure.

According to the invention it is preferred to provide a line connecting body which has a through passage extending completely through it and a connecting bore which extends transversely relative to that through passage and opens into same. The actuating element is preferably formed by a venting screw which is provided with a male thread and can be screwed from the one side into the through passage of the line connecting body; the other side of the through passage is in flow communication with the return line and the transversely extending connecting bore is in flow communication with the bypass line.

Preferably the venting screw has two longitudinal bores of which the one extends from its end disposed axially inwardly in the screwed-in condition and the other extends from the axially opposite outer end of the venting screw. The two longitudinal bores which extend in the axial direction are not directly connected together but respectively end in one or more associated, radially extending transverse bores which open through peripheral surfaces of the venting screw into the space surrounding the venting screw. The longitudinal bore which is disposed axially inwardly in the assembled condition is in flow communication with the return line while the axially outwardly disposed longitudinal bore is in communication with an outwardly extending venting line.

Both the venting screw and also the through passage have axially successively arranged portions of differing diameters which are so matched to each other that, when the venting screw is screwed completely into the through passage in the operating position, the axially inwardly disposed longitudinal bore and the associated transverse bore form a flow communication between the return line and the bypass line. On the other hand in that position a sealing surface which is provided in the region between two axially successive cylindrical portions of the venting screw, that are of differing diameter, is pressed against a corresponding sealing seat provided at the inside wall of the through passage of the line connecting body, in such a way that a seal is produced, which prevents transfer of the medium coming from the return line (in the ideal case bubble-free fuel) into the transverse bore leading to the venting line, and the associated longitudinal bore in the venting screw.

The above-mentioned seal may either involve a mating seal between a sealing surface which is provided on the venting screw and which tapers conically from the outside inwardly or is of a spherical-convex configuration and a conical sealing seat of the line connecting body or another kind of seal which is achieved for example by plastic or elastic deformation of a sealing body comprising a soft metal or an elastomer material (for example O-rings).

If the venting screw is turned in opposite relationship to the screwing-in direction through some revolutions and is thereby moved somewhat outwardly in the axial direction in the through passage it thus passes into a venting position in which the communication between the through passage and the bypass line is sealingly closed while the closure between the sealing surface on the venting screw and the sealing seat at the inside of the through passage is opened, thereby producing a flow communication between the return line and the outwardly leading longitudinal bore in the venting screw so that the pressure line region of the system is vented. In that respect it is essential that, in the axial movement of the venting screw caused by screwing it out, firstly the return line and the bypass line are completely separated from each other before the connection of the return line with the exterior is made.

By virtue of the fact that the venting screw can be moved out of the operating position into the venting position and vice-versa by rotation about its longitudinal axis, the venting procedure is very simple because the axial displacement required for the respective transition between those two positions can be exactly controlled by counting off the number of revolutions performed.

As already mentioned the sealing integrity between the various lines can also be implemented by means of elastomer seals, but a mating fit is preferred because that has higher resistance to the fuel and does not tend to suffer from gumming.

These and further advantageous configurations of the venting apparatus according to the invention are set forth in the appendant claims.

BRIEF DESCRIPTION OF THE DRAWINGS

The invention is described hereinafter by means of embodiments by way of example with reference to the drawing in which.

DETAILED DESCRIPTION OF THE INVENTION

In the Figures the same parts and components are denoted by the same references. If positional indicators like "up", "back", "left", "right" and so forth are used in describing the Figures this only relates to the position of the components in question in the Figures and is in no way to be interpreted as limiting or characterising the actual position of installation on or in a venting apparatus according to the invention or a heating device equipped with such a venting apparatus.

Figure 1:
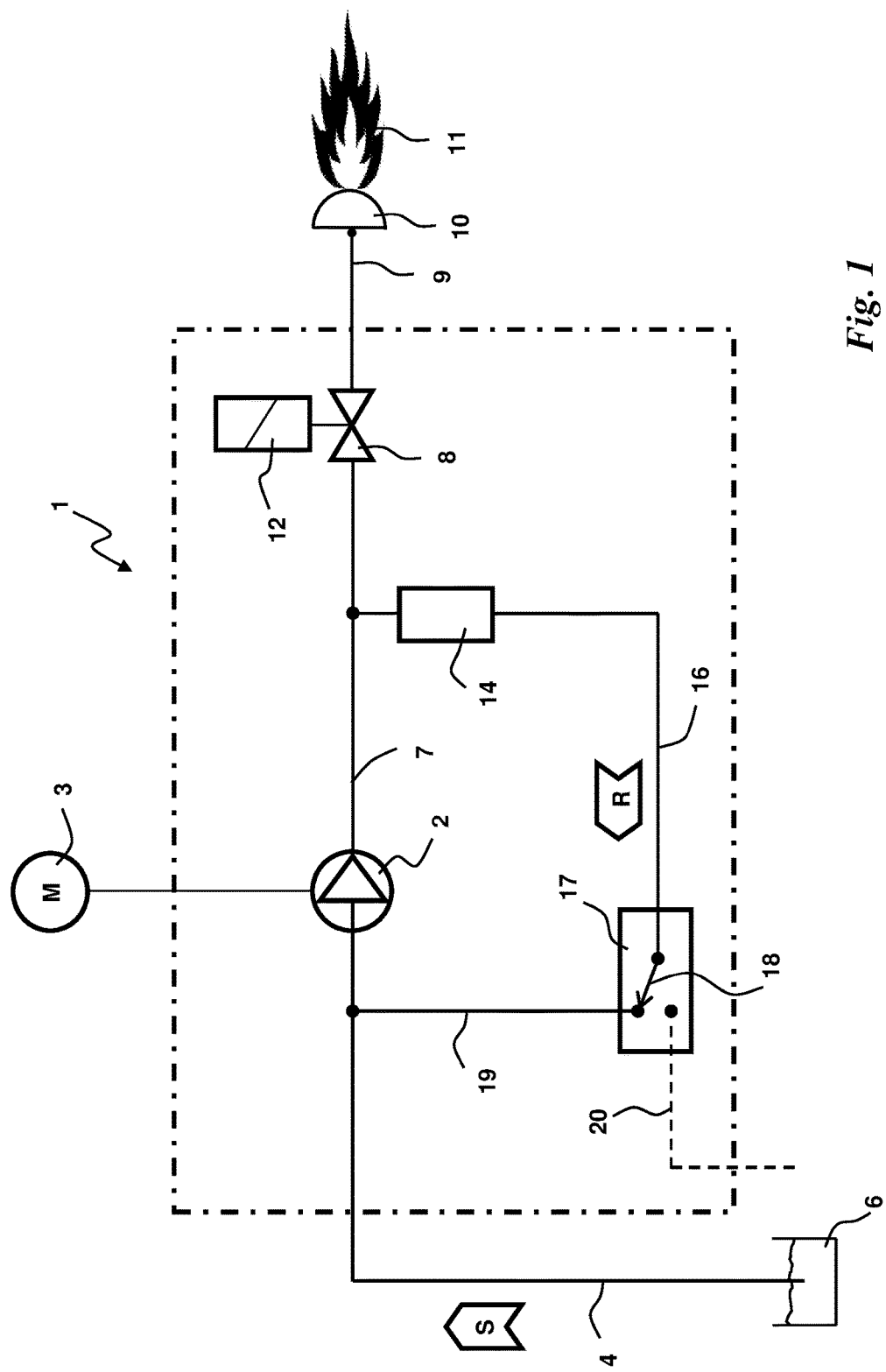
FIG. 1 shows a diagrammatic view of the hydraulic circuit diagram of a heating device provided with a venting apparatus according to the invention in the regular single-line operating condition.
Figure 2:
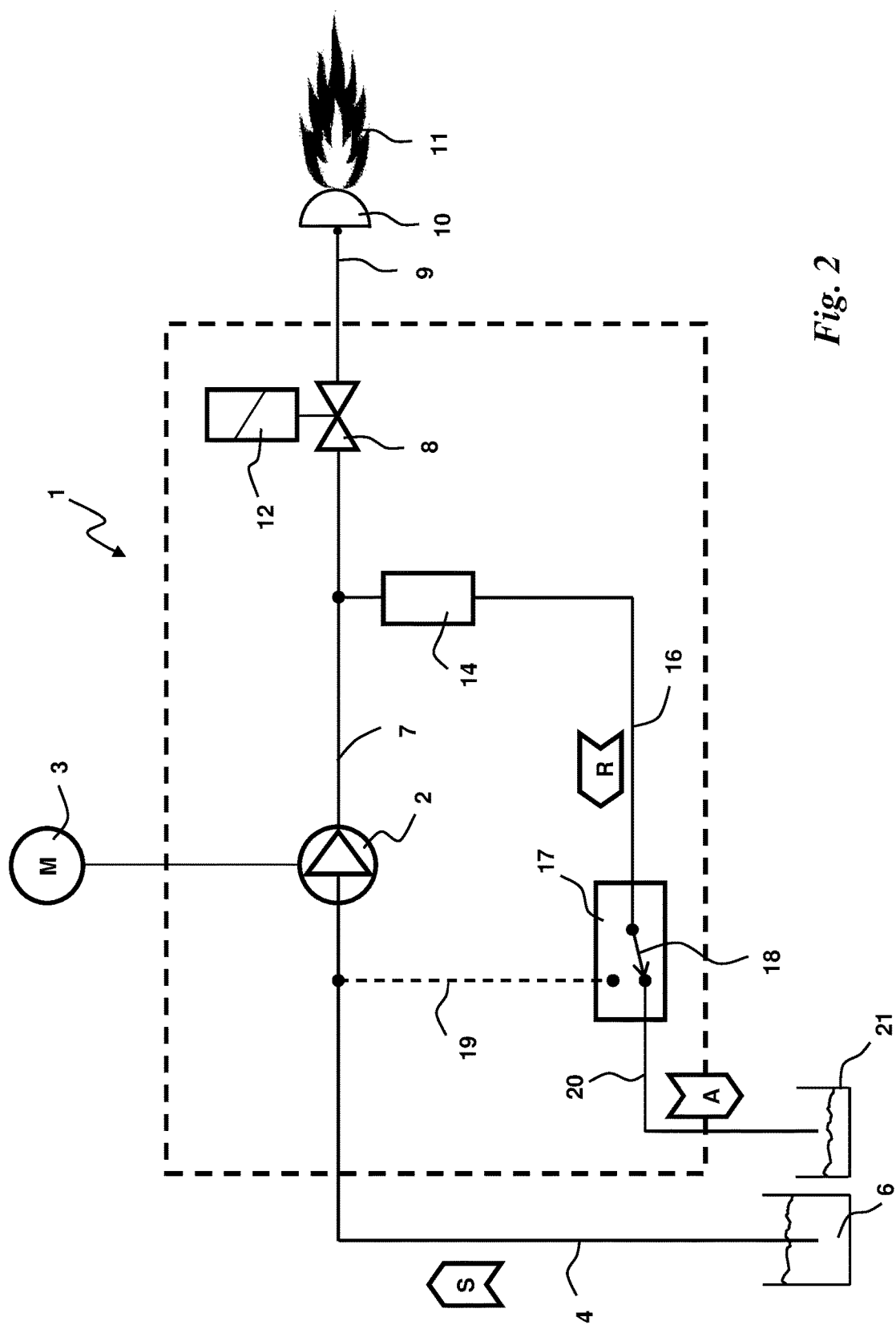
FIG. 2 shows a corresponding view of the hydraulic circuit diagram of FIG. 1 during venting.

Both of FIGS. 1 and 2 show a fuel pump 1 whose displacer 2 is driven by a motor 3 and which is admittedly preferably a gear pump but which alternatively can also be any other type of pump. The motor 3 can either be an electric motor in the illustrated fashion, which forms an independent unit or which is integrated into the fuel pump 1. Instead of an electric motor it is also possible to use another suitable kind of motor.

The fuel pump 1 draws fuel by way of a suction or feed line 4 from a fuel tank 6, as indicated by the arrow S.

On the pressure side of the displacer 2 of the fuel pump 1 firstly a line 7 goes to a shut-off valve 8 which is adjoined by a further line 9 which feeds the fuel to an atomiser nozzle 10 through which it is injected into a combustion chamber (not shown) in order there to be burnt in a flame 11.

The shut-off valve 8 is actuable by a solenoid 12 and, when no heating mode is running, is closed in order to prevent fuel from issuing into the combustion chamber.

The pressure which obtains in the lines 7 and 9 and which in the applicant's pumps can typically be in a range of 9 to 10 bars is defined by an adjustable pressure limiter 14 which, as indicated by the arrow R, feeds the fuel delivered in excess by the fuel pump 1 by way of a return line 16 to the intake connection of a line connecting body 17 having two outlet connections of which one is connected to a bypass line 19 and the other to a venting line 20.

The line connecting body 17 includes a venting apparatus 18 which in FIGS. 1 and 2 is symbolically represented as a directional control valve and the actual structure of which will be described in greater detail in particular with reference to FIGS. 3 to 6.

In normal operation as shown in FIG. 1 of a single-line system the venting apparatus 18 returns the excess fuel coming from the pressure limiter 14 back into the feed line 4 by way of the bypass line 19 while the venting line 20 which is open outwardly is separated off from a fuel feed and is therefore empty, as is indicated by the broken-line illustration thereof.

FIG. 2 shows the venting mode of operation in which the venting apparatus 18 forms a communication between the connection of the line connecting body 17, that is connected to the return line 16, and its connection connected to the venting line 20, so that fuel in the pressure line region, that is to say on the pressure side of the pump 2, with gas bubbles possibly included therein, can be let off into a catch container 21 by way of the venting line 20. In that operating condition the return line 16 is completely separated from the bypass line 19 and does not feed any fuel thereto. That is indicated by a broken-line illustration of the bypass line 19.

In FIGS. 1 and 2 the shut-off valve 8, the solenoid 12 serving for actuation thereof, the pressure limiter 14, the line connecting body 17, the bypass line 19 and the venting line 20 are integrated into the fuel pump 1 indicated by a dash-dotted line, or are assembled directly to the pump housing.

That arrangement however is not necessarily the case; thus individual ones, all or any combinations of the units or components 8, 12, 14, 17, 19, 20 can be positioned separately from the pump body. According to the invention it is also possible to provide any other variations and combinations of the possible arrangements just referred to.

Figure 3:
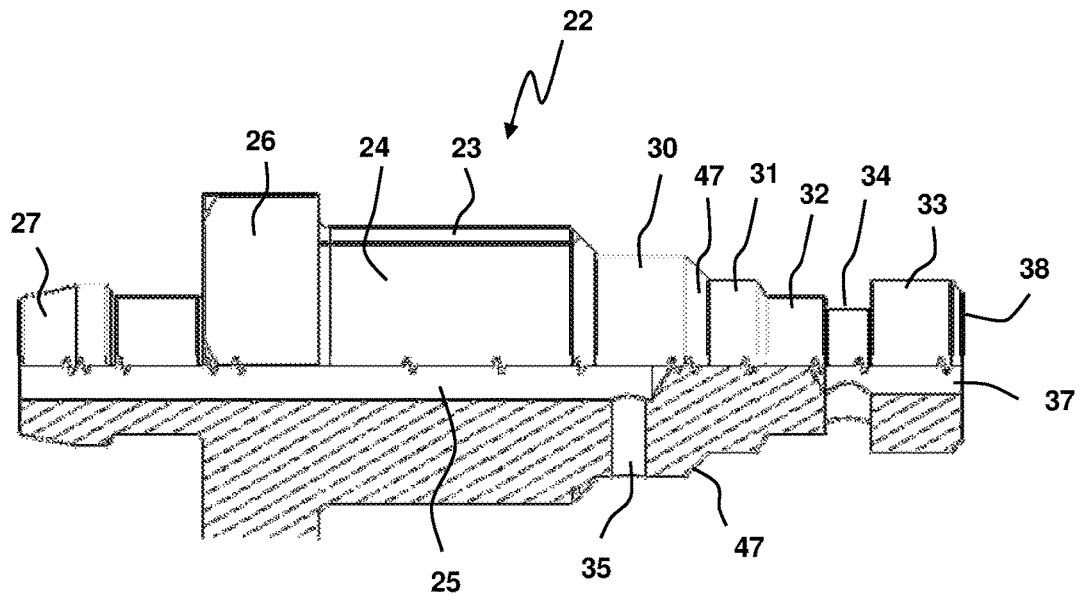
FIG. 3 shows a partly sectional side view of the preferred embodiment of a venting screw used in the venting apparatus according to the invention.
Figure 4:
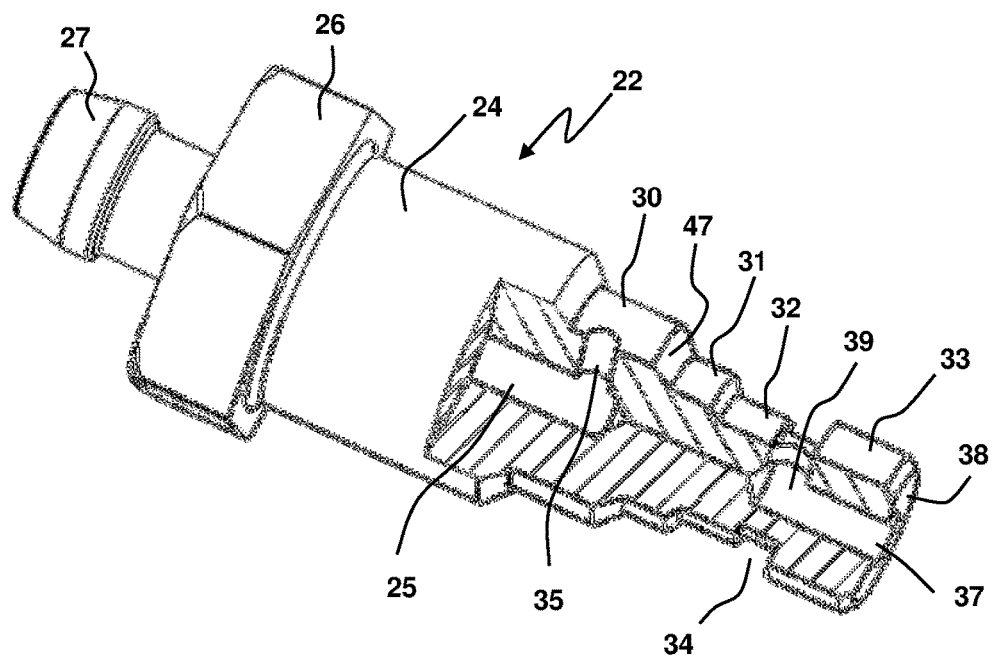
FIG. 4 shows a perspective partly sectional view of the venting screw of FIG. 3.

FIGS. 3 and 4 show a preferred embodiment of a venting apparatus 18 according to the invention, which is embodied here in the form of a venting screw 22.

The venting screw 22 includes a cylindrical main portion 24 provided with a male thread 23 (not shown in FIG. 4) and through which passes a central, axially extending internal longitudinal bore 25.

At its left-hand side in FIGS. 3 and 4 the main portion 24 is provided with a hexagon 26 which is adjoined towards the left by a hose nozzle 27. The main portion 24, the hexagon 26 and the hose nozzle 27 are concentric relative to the longitudinal axis of the venting screw 22 and are integrally connected together.

A preferably transparent fuel hose (not shown separately) can be fitted on to the hose nozzle 27 at least during the venting operation; the hose then forms the venting line 20 (see FIGS. 1 and 2) and can lead to a catch container 21 (see FIG. 2). The transparency of the fuel hose makes it possible to observe the discharge of air bubbles.

Adjoining the main portion 24 which is provided with the male thread 23, towards the right in the axial direction, are four further cylindrical portions 30, 31, 32 and 33 which are in one piece with the main portion 24 and of which the first three are of a smaller outside diameter than the respective cylindrical portion to the left thereof. The cylindrical portion 33 forming the right-hand end of the venting screw 22 is of the same outside diameter as the second cylindrical portion 31 and is separated from the third cylindrical portion 32 by a groove 34 extending over the entire peripheral of the venting screw 22. The third cylindrical portion 32 and the groove 34 can be of the same diameter.

The internal longitudinal bore 25 only extends through the hose nozzle 27, the hexagon 26 and the cylindrical main portion 24 into the first cylindrical portion 30 which is of a reduced diameter in relation to the main portion 24, wherein at the axial end of the cylindrical portion 30 that is remote from the hose nozzle 27 the longitudinal bore opens into a transverse bore 35 which extends radially at one side and which extends outwardly as far as the cylindrical outside surface of the cylindrical portion 30 and through same. That transverse bore 35, starting from the internal longitudinal bore 25, can extend radially outwardly towards both sides. In that case it passes completely through the first cylindrical portion 30 and opens outwardly on diametrally opposite sides of its cylindrical outside surface. As an alternative thereto it is also possible to provide a plurality of radially extending transverse bores which extend outwardly at least at one side and are in communication with the internal longitudinal bore 25.

The two cylindrical portions 31, 32 of the venting screw 22, which adjoin the cylindrical portion 30 towards the right in FIG. 3, do not have an internal bore and, by virtue of their smaller outside diameter, are stepped down both with respect to the cylindrical portion 30 and also in relation to each other.

The cylindrical portion 33 forming the end region of the venting screw 22, that is at the right in FIGS. 3 and 4, also has a central internal bore 37 which extends through same in the longitudinal direction in the axial direction and which opens outwardly at the end 38 of the venting screw 22 and at its axially inner end is in communication by way of one or more transverse bores 39 with the outwardly open groove 34.

Figure 5:
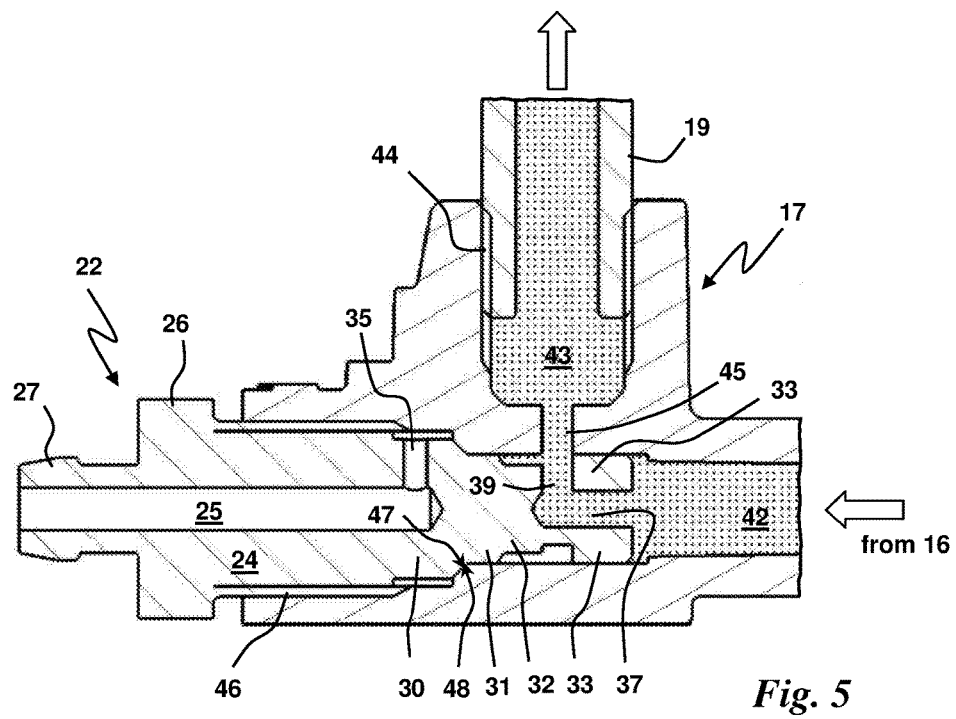
FIG. 5 shows an enlarged sectional view of the preferred embodiment of a venting apparatus according to the invention in the regular single-line operating condition.
Figure 6:
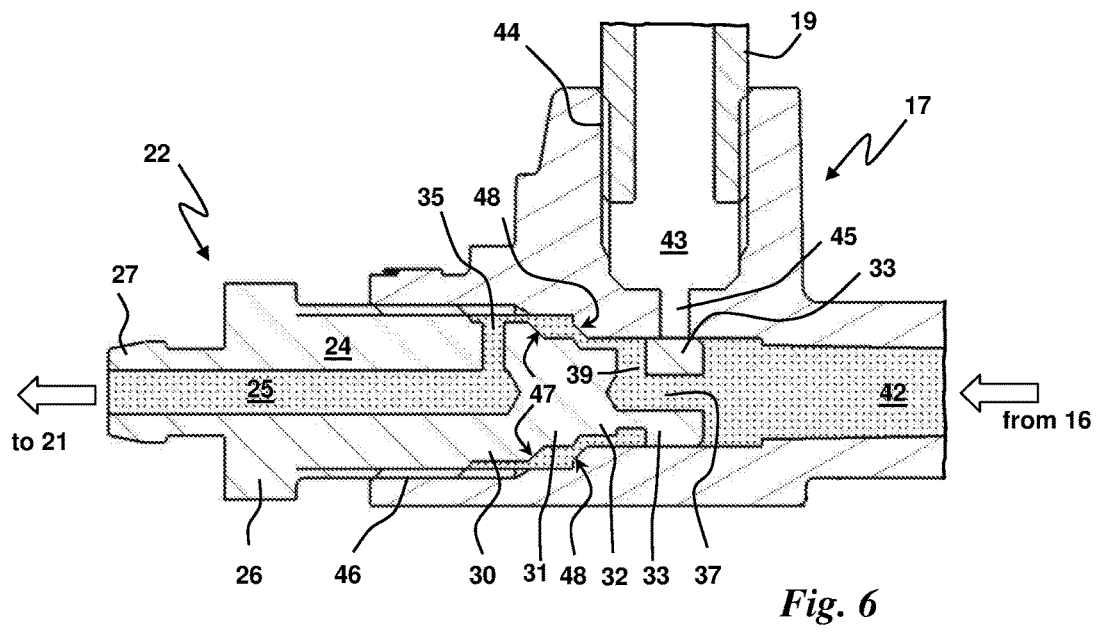
FIG. 6 shows a sectional view corresponding to FIG. 5 of the venting apparatus according to the invention during venting.

FIGS. 5 and 6 show the venting screw 22 cooperating with a line connecting body 17 which can be of any suitable external shape and which has a through passage 32 extending completely through it and extending horizontally in FIGS. 5 and 6, and a connecting bore 43 opening into same perpendicularly from above. A bypass line 19 is screwed from above into the female thread 44 thereof in the illustrated example. That connecting bore 43 is in communication with the through passage 42 by way of a connecting bore 45 of smaller diameter.

The return line 16 which is not shown here opens from the right into the through passage 42. On the opposite side the through passage 42 is of a diameter which is so large that the venting screw 22 can be screwed into a female thread 46 provided there, with the male thread 23 provided on its cylindrical main portion 24, from the left at a maximum to such an extent that the cylindrical portion 30 which adjoins the main portion 24 and which is of a smaller diameter than the main portion 24 bears with a sealing surface 47 which is shown here as conical but which alternatively can also be convexly rounded and which tapers to the next cylindrical portion 31 which is of an even smaller diameter, against a conical sealing seat 48 provided in the interior of the through passage 42, in such a way that fuel which is indicated in FIGS. 5 and 6 by a dot pattern cannot pass from the return line 16 which enters from the right to the longitudinal bore 25 in the venting screw 22 and thus also not outwardly, as shown in FIG. 5.

At the same time, in that completely screwed-in position of the venting screw 22, the internal bore 37 which extends in the axial direction through the entire cylindrical portion 33 disposed at the left and into which the fuel coming from the return line 16 (see FIGS. 1 and 2) is flowing is in communication by way of the transverse bore 39 (see FIG. 4) and the groove 34 with the connecting bore 45, by way of which the fuel can flow upwardly into the bypass line 19.

In FIG. 6 the venting screw 22 has been screwed out towards the left in the axial direction out of the female thread 46 of the through passage 42 to such an extent that its cylindrical portion 33 which is entirely at the right sealingly closes the connecting bore 45 leading to the bypass line 19.

In addition the sealing surface 47 provided on the cylindrical portion 30 is moved in the axial direction away from the sealing seat 48 at the inside wall of the through passage 42. By virtue of suitable adaptation of the inside diameters of the individual portions of the through passage 42 to the differing diameters of the cylindrical portions 30, 31 and 32, a flow gap communicating with the groove 34 is opened, the gap leading from the internal bore 37 of the cylindrical portion 33 disposed entirely at the right by way of the transverse bore 39 and the groove 34 between the sealing seat 48 and the sealing surface 47 to the transverse bore 35 which in turn is in communication with the longitudinal bore 25 of the main portion 24 so that in that venting position of the venting screw 22, pressurised medium in the pressure line region (fuel and/or air and/or a mixture thereof) can issue by way of the hose nozzle 27 and a venting line 20 which can be secured thereto (see FIGS. 1 and 2).

It should be pointed out that FIGS. 3 to 6 do not show sealing elements comprising an elastically or plastically deformable material (sealing collars, O-rings and so forth), which the man skilled in the art if required can readily provide at necessary or appropriate locations or portions.

Figure 7:
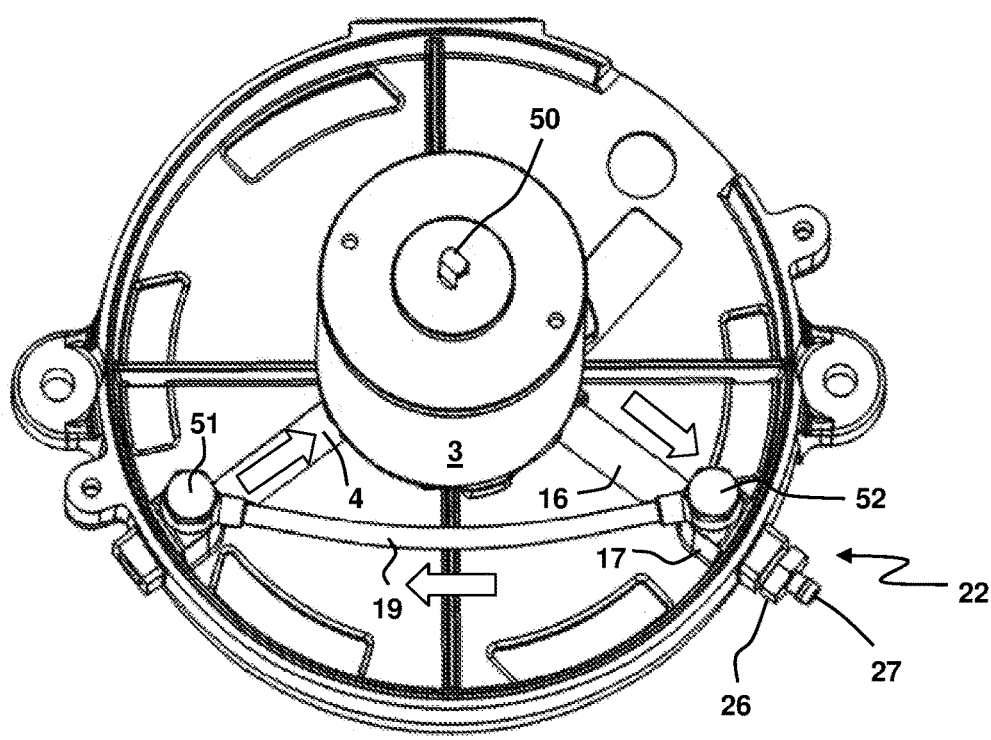
FIG. 7 shows a perspective view of an intermediate plane of a heating device equipped with a venting apparatus according to the invention.

FIG. 7 shows a simplified perspective cross-sectional view through the housing of a heating device equipped with a venting apparatus 18 according to the invention, in the centre of which is shown the motor 3, on the upwardly projecting shaft 50 of which the fan wheel of a fan can be fitted, which serves to feed combustion air to the combustion chamber of the heating device.

At the lower side of the motor 3 as shown in FIG. 7 there is a fuel pump (not visible here) whose feed line 4 is in communication by way of a connecting hollow screw 51 on the one hand with the fuel feed line coming from the exterior and on the other hand with the bypass line 19 which in turn is connected by way of a second connecting hollow screw 52 to the return line 16. Arranged in the region of the second connecting hollow screw 52 is the venting screw 22, of which however here only the hexagon 26 and the outwardly extending hose nozzle 27 are to be seen.

Figure 8:
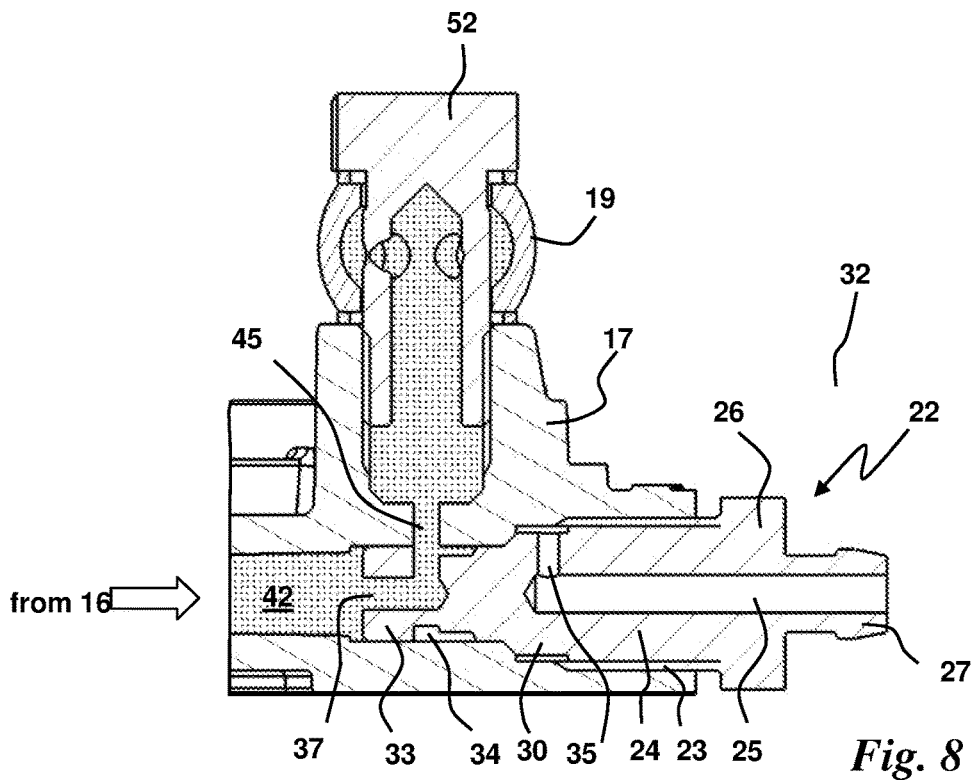
FIG. 8 shows a sectional view through the venting apparatus of FIG. 7 in the regular single-line operating condition.

The connecting hollow screw 52 is screwed from above into the connecting bore 43 of the line connecting body 17. Unlike the situation shown in FIGS. 5 and 6 the bypass line 19 here does not open directly from above into the connecting bore 43 but from the side into the connecting hollow screw 52, as is also shown in FIG. 8 which otherwise substantially corresponds to FIG. 5, in relation to which it is disposed in mirror image about a vertical axis. It also shows the normal operating condition in which the venting screw 22 is screwed completely into the line connecting body 17 so that there is a through flow communication for the fuel coming from the return line 16 into the bypass line 19 while no fuel or fuel/air mixture can issue from the hose nozzle 27.

The invention claimed is:

1. A venting apparatus (18) for a heating device having an exterior and operating with liquid fuel in a single-line mode and including a fuel pump (1) which is driven by a motor (3) which pump draws fuel from a supply tank (6) and delivers it into a pressure line region which is in communication with an atomiser nozzle (10) opening into a combustion chamber,
   wherein excess fuel is returned from the pressure line region by way of a pressure regulator (14), a return line (16) and a bypass line (19) to a suction side of the fuel pump (1),
   wherein the venting apparatus (18) comprises a through passage (42) which is in flow communication with said return line (16) and can be connected to or separated from said bypass line (19) by moving back or forth an actuating element which is arranged inside said through passage (42) and is reciprocable in axial direction between an operating position and a venting position,
   wherein a venting line (20) is provided which connects the through passage (42) of said connecting body (17) to said exterior of the heating device, and
   wherein the actuating element is adapted:
      to connect the return line (16) to the bypass line (19) in its operating position and, in that case, to ensure reliable sealing of a medium disposed in that lines towards said exterior,
      to connect the return line (16) to the venting line (20) in its venting position and, in that case, to close the bypass line (19), and
   in its movement from its operating position into its venting position, firstly to close the bypass line (19) and only then to connect the return line (16) to said exterior.

2. The venting apparatus (18) according to claim 1, further comprising a line connecting body (17) in which the through passage (42) is provided.

3. The venting apparatus (18) according to claim 2, wherein the actuating element has two longitudinal bores (25, 37) which starting from its two ends (27, 38) extend in an axial direction towards each other without being in direct communication with each other and each of which at its inwardly disposed axial end is in communication with at least one transverse bore (35, 39) which extends radially through the actuating element and opens at a peripheral surface of the actuating element, wherein, in the venting position, a longitudinal bore (25) is connected to the outwardly leading venting line (20) while when the actuating element is in the operating position the other longitudinal bore (37) is in flow communication with the return line (16).

4. The venting apparatus (18) according to claim 2, wherein the actuating element is a venting screw (22) which is screwed into an internal female thread in the through passage (42) and is displaceable by rotation about is longitudinal axis in the axial direction between the operating position and the venting position.

5. A heating device operating with liquid fuel in the single-line mode and including a venting apparatus (18) according to claim 1.

* * * * *